United States Patent Office 3,753,911
Patented Aug. 21, 1973

3,753,911
HIGH STRENGTH BARIUM TITANATE CERAMIC BODIES
Basil E. Walker, Jr., Oxon Hill, Md., and J. Richard Spann, McLean, and Roy W. Rice, Alexandria, Va., assignors to the United States of America as represented by the Secretary of the Navy
No Drawing. Filed June 24, 1971, Ser. No. 156,493
Int. Cl. C04b 35/46
U.S. Cl. 252—62.9        5 Claims

ABSTRACT OF THE DISCLOSURE

The mechanical strength and densification of barium titanate ceramic bodies are enhanced by the addition of small amounts of halide salts in combination with metal oxides. Transparency of barium titanate bodies are also attained by the addition of an alkali fluoride.

BACKGROUND OF THE INVENTION

Field of the invention

This invention relates to ceramic materials and, more particularly, to barium titanate ceramics having improved strength and density properties.

Description of the prior art

Barium titanate is a well known dielectric material commonly employed in a wide variety of applications in the electronics industry. Where the material is formed into piezoelectric ceramic bodies, its mechanical strength becomes of utmost importance. Previous attempts to provide strong barium titanate piezoelectric ceramic bodies, such as, for example, transducer rings, has resulted in impairment of the ferroelectric and dielectric properties of the ceramic body. Prior art additives, such as Ce, Ta, or Nb, diminish the dielectric strength whereas other materials such as Bi, Sb, or As that don't diminish the dielectric strength, cause manufacturing difficulties and lack of uniformity from batch to batch due to their high vapor pressure.

SUMMARY OF THE INVENTION

The present invention provides novel barium titanate-based ceramic bodies having improved densification and mechanical strength properties without impairment of ferroelectric and dielectric characteristics. The combination of at least about 0.1% halide salts selected from the group consisting of alkali metal fluorides and LiCl with at least about 0.5% MgO or $La_2O_3$ and the balance $BaTiO_3$, comprise the ingredients for the high strength ceramic bodies. Standard manufacturing techniques such as, for example, cold pressing, sintering and annealing or hot pressing plus annealing are suitable to produce the novel ceramic bodies for use as piezoelectric elements, capacitors, and electro-optical elements.

DESCRIPTION OF THE PREFERRED EMBODIMENTS

In accordance with the present invention an improved piezoelectric ceramic body, based on barium titanate, can be made with standard ceramic techniques having unexpectedly high mechanical strength if small amounts of a halide salt and a metal oxide are added to the ceramic mixture. By the phrase standard ceramic techniques it is meant that the barium titanate mixes may be cold pressed and then fired under various controlled environmental conditions and annealed or hot pressed with subsequent annealing.

Properties of barium titanate powders useful with the present invention are listed and compared in Table I. These powders, which are available commercially, were pressed and annealed into ceramic bodies and subsequently tested for mechanical strength on an Instron test machine. Density was determined by the buoyancy method and the approximate grain size and porosity were determined with optical and electron microscopy techniques. The above testing methods were also utilized on the ceramic bodies set forth in Tables II–V. As can be seen in Table I, Sample A had a 1.5% impurity level but also had the greatest strength. (This is likely the result of its small grain size.) The impurities present in the powders were primarily hydroxides and carbonates, however, their presence was of no effect since they substantially all disappeared during heat treatment of the test specimens.

TABLE I

| $BaTiO_3$ sample powders [1] | Wt. percent Impurities | Wt. percent Additives | Annealing temp., °C. | Percent theoretical density | Modulus of rupture (R), p.s.i. | Average particle size, μ |
|---|---|---|---|---|---|---|
| A | 1.5 | 0 | 900 | 98.0 | 15,500 | 0.5 |
| B | 2.0 | 0 | 900 | 98.5 | 12,000 | 1.0 |
| C | 0.2 | 0 | 1,300 | 99.0 | 11,500 | 1.0 |
| D | 0.3 | 0 | 1,000 | 91.0 | 5,500 | 1–2.0 |

[1] Samples were hot pressed 10–50 min. at 1,000–5,000 p.s.i.; at 900–1,200° C., and annealed for about 20 hours.

Table II illustrates the results obtainable when various single ingredients are added to the barium titanate mixes. Commercially manufactured barium titanate transducer rings containing calcium titanate as an additive were also tested and listed for comparison purposes. Table III is similar in that it shows the mechanical strength properties of multiple ingredients in combination with barium titanate.

TABLE II

| $BaTiO_3$ sample powders [1] | Wt. percent Impurities | Wt. percent Additives | Annealing temp., °C. | Percent theoretical density | Modulus of rutpure (R), p.s.i. | Average particle size, μ |
|---|---|---|---|---|---|---|
| #1 [2] | 2–4.0 | 5% $CaTiO_3$ | | 95 | 16,000 | 8 |
| #2 [2] | 2–4.0 | 5% $CaTiO_3$ | | 94 | 15,000 | 2 |
| #3 [2] | 2–4.0 | 5% $CaTiO_3$ | | 95 | 14,000 | 2 |
| A | | 2% LiF | 1,000 | 98 | 15,000 | |
| A | | 2% MgO | 1,300 | 95 | 7,000 | 6 |
| A | | 1% $MgF_2$ | 1,000 | 95.5 | 9,000 | 3 |
| A | | 2% ZnO | 1,100 | 99 | 17,000 | |
| B | | 2% LiF | 900 | 95.5 | 8,500 | |
| D | | 2% LiF | 1,100 | 97.5 | 14,500 | |

[1] Samples were hot pressed 10–50 min. at 1,000–5,000 p.s.i.; at 900–1,200° C. and annealed for about 20 hours.
[2] Commercial $BaTiO_3$ Transducer Ring Test samples.

TABLE III

| BaTiO₃ sample powders | Wt. percent additives | Annealing temp., °C. | Percent theoretical density | Modulus of rupture (R), p.s.i. | Average particle size, μ |
|---|---|---|---|---|---|
| A | 5% CaTiO₃ / 0.5% CoCO₃ | 1,400 | 92.5 | 9,000 | 3 |
| A | 0.5% LiF / 1.0% Ta₂O₅ | 1,000 | 98.0 | 17,000 | 3 |
| A | 1.0% LiF / 1.0% MgF₂ | 1,100 | 97.0 | 13,000 | 6 |
| A | 1.0% LiF / 1.0% Al₂O₃ | 1,000 | 90.0 | 10,000 | 1 |
| A | 5.0% CaTiO₃ / 0.5% CaTiO₃ | 1,300 | 95.0 | 14,500 | 1 |

Table IV exemplifies the present invention and demonstrates the unexpected improvement in mechanical strength of hot pressed barium titanate ceramics by the addition of varying amounts of alkali metal fluorides, magnesium fluoride and lithium chloride in combination with magnesium oxide. As shown, at least 0.1% of a halide salt in combination with magnesium oxide significantly improves the mechanical strength of the barium titanate-based ceramic bodies. La₂O₃ can be used in place of the MgO, and other alkali fluorides such as, for example, potassium fluoride, are suitable for use in place of the fluorides listed in Table IV. Additionally, although only two additives are shown in combination with the BaTiO₃, various combinations of three or more of the additives can be utilized. The samples were hot pressed at 1000° C. and annealed for 20 hours at the temperature indicated. The optimum annealing temperature was between 1000 and 1200° C.

TABLE IV

| BaTiO₃ sample powders | Wt. percent additives | Annealing temp., °C. | Percent theoretical density | Modulus of rupture (R), p.s.i. | Average grain size, μ |
|---|---|---|---|---|---|
| A | 0.5 LiF plus MgO | (¹) | 97.5 | 19,500 | 0.8 |
| | | 1,000 | 98.0 | 21,500 | 20 |
| | | 1,100 | 99.0 | 20,000 | 150 |
| | | 1,200 | 99.0 | 29,500 | 150 |
| A | 1.0 LiF plus MgO | 1,100 | 98.0 | 20,000 | 1.0 |
| | | 1,200 | 98.0 | 26,000 | 4.0 |
| A | 1.0 MgF₂ plus 1.0 MgO | (¹) | 96.5 | 21,000 | 1.0 |
| | | 1,000 | 97.0 | 23,000 | 5.0 |
| | | 1,200 | 96.0 | 20,000 | 5.0 |
| C | 1.0 LiF plus 2.0 MgO | 1,000 | 99.0 | 22,000 | 1.0 |
| | | 1,100 | 99.0 | 19,000 | 1.0 |
| A | 1.0 NaF plus 1.0 MgO | 1,000 | 98.5 | 23,000 | 3.0 |
| | | 1,200 | 99.0 | 20,000 | 10.0 |
| | | 1,300 | 98.5 | 23,000 | 5.0 |
| B | 1.0 LiF plus 2 MgO | 1,000 | 96.0 | 25,000 | 1.0 |
| A | 0.2 LiF plus 2.0 MgO | 1,200 | 99.0 | 27,000 | 150 |
| A | 1.0 LiF plus La₂O₃ | 1,150 | 98.5 | 20,000 | 1.0 |

¹ Room temperature.

TABLE V

| Wt. percent additives: | Annealing temp., °C. | Percent theoretical density | Average modulus of rupture (R), p.s.i. | Average grain size, μ | Dielectric constant | Loss factor, percent |
|---|---|---|---|---|---|---|
| 0.5 LiF plus 2.0 MgO | 1,200 | 99.0 | 29,500 | 150 | 3,300 | 0.3 |
| 1.0 LiF plus 2.0 MgO | 1,000 | 98.0 | 24,500 | 10 | 2,300 | 0.5 |
| 1.0 NaF plus 1.0 MgO | 1,000 | 98.5 | 23,000 | 3 | 11,100 | 0.8 |
| 1.0 NaF plus 1.0 MgO | 1,200 | 99.0 | 20,000 | 10 | 4,200 | 0.6 |
| 1.0 NaF plus 1.0 MgO | 1,300 | 98.5 | 23,000 | 5 | 7,700 | 0.5 |
| 1.0 MgF plus 1.0 MgO | 1,000 | 97.0 | 23,000 | 5 | 3,300 | 0.3 |
| 0.5 LiF plus 1.0 MgO plus Ta₂O₅ | 1,000 | 98.0 | 18,500 | 5 | 4,450 | 0.3 |
| Commercial sample: | | | | | | |
| #1 | | 95.0 | 16,000 | 8 | 2,000 | 1.0 |
| #2 | | 94 | 15,000 | 2 | 2,000 | 1.0 |
| #3 | | 95 | 14,000 | 2 | 2,000 | 1.0 |

Other prior art additives may be used with the halide salt-metal oxide combination to effect specific purposes. Illustrative of such additives is magnesium titanate, cobalt titanate, calcium titanate, aluminum oxide, tantalum oxide, and the like. The ceramic bodies of the present invention may also be cold pressed and then sintered at about 1000° C. for 1-2 hours under an air, vacuum, or hydrogen environment and then annealed (as in the hot pressing operation). The best results occur when the cold pressed bodies are sintered under reducing conditions, such as a vacuum or hydrogen atomsphere, prior to annealing.

The dielectric properties of various barium titanate-based ceramics of the present invention are listed in Table V and compared to typical commercial samples. As shown, the loss factors and dielectric constants of the high strength materials compare favorably with the prior art. In addition to being useful as dielectric bodies the ceramics of the present invention show transparencies for radiation in the visible region for samples up to 0.2 inch thick. Tests using a 2854° K. tungsten filament light source show in-line, i.e., normal, light transmission values on 0.010 inch samples of 2 to 5% relative to a single crystal BaTiO₃. Samples without the additives of the present invention gave less than 1% normal light transmission. The presence of LiF in the ceramic bodies appeared to be a major factor in providing the transparency. As a result, the present invention has importance for use as electro-optical switching elements. Additionally, piezoelectric tests on typical barium titanate samples of the present invention containing LiF-MgO or NaF-MgO showed apparent coupling factors of about 0.1. This is a significant response since commercial samples range from 0.1 to 0.2.

What is claimed and desired to be secured by Letters Patent of the United States is:

1. A BaTio₃ piezoelectric ceramic body consisting of:
    at least about 0.1% by weight of a halide salt selected from the group consisting of alkali metal fluorides, MgF₂ and LiCl;
    at least about 0.5% by weight MgO or La₂O₃; and the balance BaTiO₃,
    said ceramic body exhibiting a higher average modulus of rupture than a BaTiO₃ ceramic body without said halide salt and MgO or La₂O₃.

2. The ceramic body of claim 1 wherein said halide salt is LiF.

3. The ceramic body of claim 1 wherein said halide salt is MgF₂.

4. The ceramic body of claim 1 wherein said halide salt is LiCl.

5. The ceramic body of claim 1 wherein said halide salt is NaF.

References Cited

UNITED STATES PATENTS

| | | | |
|---|---|---|---|
| 3,000,745 | 9/1961 | Cianchi | 106—39 R |
| 2,695,239 | 11/1954 | Oshry | 106—39 R |
| 3,340,074 | 9/1967 | Herczog | 106—39 R |
| 3,462,378 | 8/1969 | Remelka | 252—62.9 |
| 3,586,642 | 6/1971 | Matsuo et al. | 106—39 R |

OSCAR R. VERTIZ, Primary Examiner

J. COOPER, Assistant Examiner

U.S. Cl. X.R.

106—39 R